United States Patent
Paramadilok

(10) Patent No.: US 8,340,511 B2
(45) Date of Patent: Dec. 25, 2012

(54) PORTABLE PHOTO BOOTH

(76) Inventor: Sidney Paramadilok, Chicago, IL (US)

( * ) Notice: Subject to any disclaimer, the term of this patent is extended or adjusted under 35 U.S.C. 154(b) by 0 days.

(21) Appl. No.: 12/899,719

(22) Filed: Oct. 7, 2010

(65) Prior Publication Data

US 2012/0087643 A1    Apr. 12, 2012

(51) Int. Cl.
*G03B 15/00* (2006.01)
(52) U.S. Cl. .............................................. 396/2
(58) Field of Classification Search ............... 396/1, 2
See application file for complete search history.

(56) References Cited

U.S. PATENT DOCUMENTS

| | | | |
|---|---|---|---|
| 5,784,651 A * | 7/1998 | Mauchan ........................ 396/2 |
| 6,928,238 B2 * | 8/2005 | Nakanishi et al. ............. 396/2 |
| 7,680,401 B1 | 3/2010 | Adelstein |
| 7,885,522 B2 * | 2/2011 | Gassman et al. ................ 396/2 |
| 2007/0031133 A1 | 2/2007 | Boccacci |
| 2008/0002956 A1 | 1/2008 | Iguchi |
| 2008/0310829 A1 | 12/2008 | Blakewell |
| 2009/0067825 A1 | 3/2009 | Valvo |
| 2010/0008657 A1 | 1/2010 | Gassman |
| 2011/0211819 A1 * | 9/2011 | Reno ............................... 396/2 |

* cited by examiner

*Primary Examiner* — Clayton E Laballe
*Assistant Examiner* — Linda B Smith
(74) *Attorney, Agent, or Firm* — Richards Patent Law P.C.

(57) ABSTRACT

A portable photo booth may be transported to various entertainment events after being disassembled into readily transportable component. The photo booth may comprise a tent-like enclosure into which 1 to 15 people may enter to be photographed. Upon arrival at an event site the enclosure may be erected and a collection of separable equipment boxes may be attached to the enclosure. The equipment boxes may contain pre-connected equipment such as a camera, a laptop computer, a monitor, a light source and a printer. After the event, the photo booth may be disassembled into readily transportable components and carried to another event.

6 Claims, 3 Drawing Sheets

PORTABLE PHOTO BOOTH

BACKGROUND OF THE INVENTION

The present invention generally relates to photo booths into which one or more people may enter and then take photos of themselves. More particularly, the invention relates to such photo booths which may be readily transported between locations.

Traditional photo booths were designed for use in amusement parks and shopping malls so there was no need for portability. Recently, photo booths have become very popular at weddings, Bar and Bat Mitzvah's, corporate events, holiday parties, social gatherings, and countless other events. This popularity has created a need for photo booth portability. Additionally, photo booth designs have evolved to include sensitive photo equipment and expensive computer hardware.

As can be seen there is a need for ease of portability of a photo booth while retaining rigidness of construction of the booth to prevent damage to equipment.

SUMMARY OF THE INVENTION

In one aspect of the present invention, a portable photo booth may comprise: a tent-like enclosure; and at least a first equipment box attached to the enclosure.

In another aspect of the present invention, an equipment box for a portable photo booth may comprise: a top with a retractable handle; a bottom with attachment bolts; and a slidable access door.

In still another aspect of the invention, a method for providing a portable photo booth for an event may comprise the steps of: erecting a frame; applying a tent-like enclosure to the frame; and attaching equipment boxes to the enclosure.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a portable photo booth which may be constructed from a plurality of separable and readily transportable components. The components may be transported, assembled together to form a booth at a first location and then disassembled to facilitate subsequent transport and subsequent re-assembly at a new location.

Figure 1:
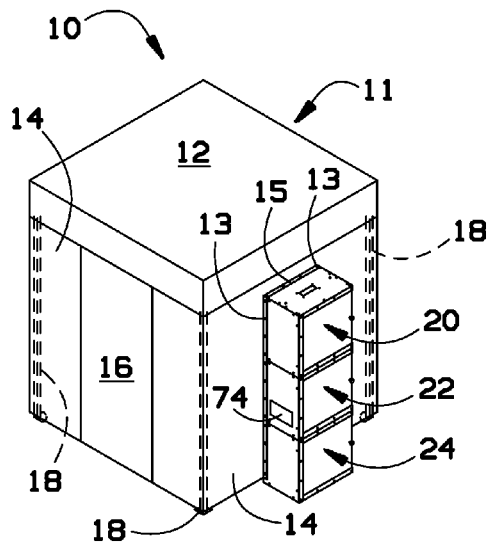
FIG. 1 is a perspective view of a portable photo booth in accordance with an embodiment of the invention.

Referring now to the FIG. 1, an exemplary embodiment of a portable photo booth 10 may comprise an enclosure 11 which may have a tent-like construction. The enclosure 11 may comprise a canopy top 12, fabric side walls 14 and a fabric door 16. Fabric elements of the booth 11 may be supported on a frame 18. The enclosure 11 may be large enough to accommodate up to about four people standing together comfortably and up to about fifteen people who may be crowded together in the enclosure for a series of fun pictures. In an exemplary embodiment the enclosure 11 may have a height of about 7 feet 6 inches and may cover a floor area of about 25 square feet.

Figure 2:
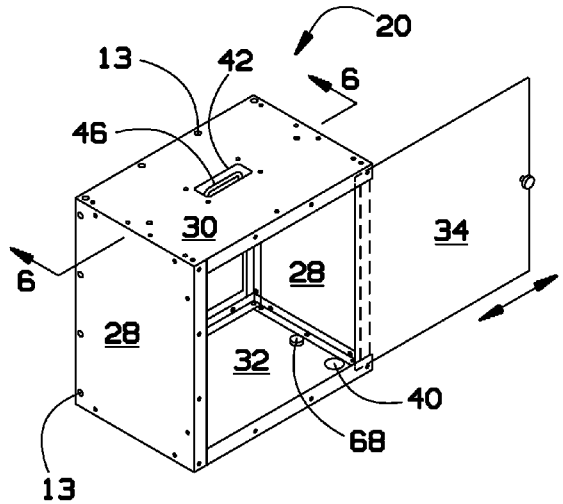
FIGS. 2 and 3 are perspective views of an equipment box in accordance with an embodiment of the present invention.
Figure 3:
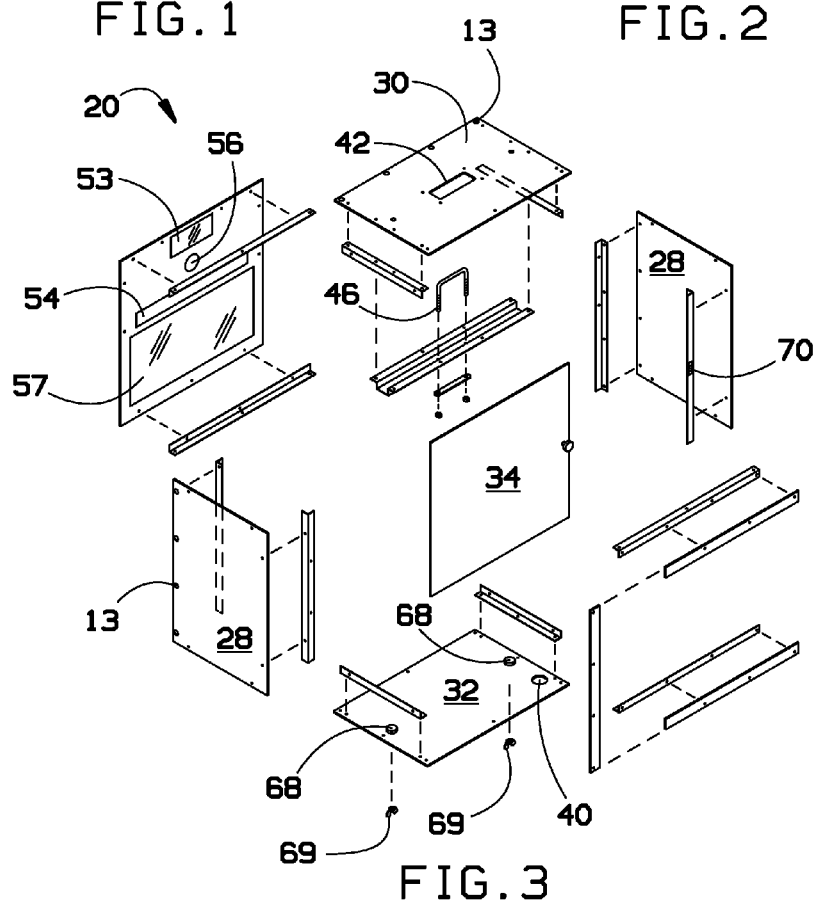
Figure 7:
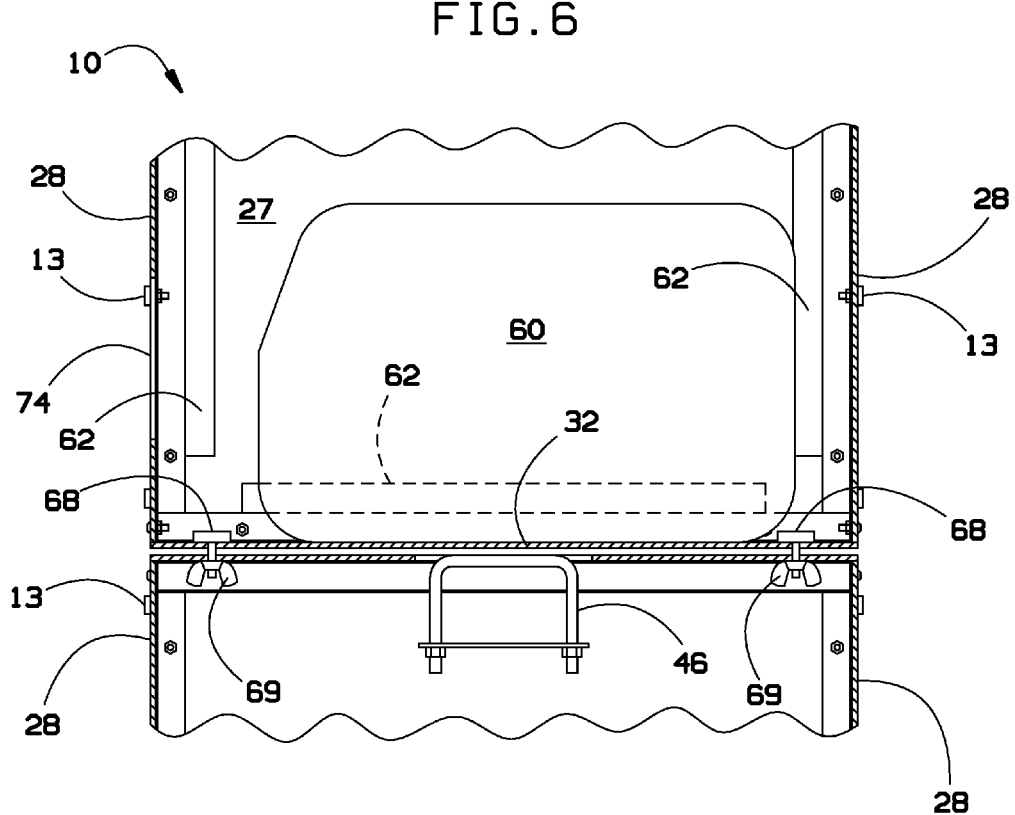

An operational opening 15 may be formed in one of the side walls 14. Equipment boxes may be attached to the enclosure 11 at the opening 15 with snap fasteners 13. These equipment boxes may include a camera box 20, a printer box 22 and a storage/power box 24. The boxes 20, 22 and 24 may be constructed with a rigid structure and may be selectively attachable and separable from one another. The boxes 20, 22 and 24 may have dimensions of 20"×21"×12" (i.e., about 4 cubic feet) and a weight of about 20 pounds. The boxes, when loaded with their respective equipment components, may have individual weights less than about 50 pounds. Consequently, the boxes 20, 22 and 24 may be readily transported between event sites Referring now to FIG. 2, general construction characteristics of the box 20 may be seen. It may be noted that the boxes 22 and 24 may be similarly constructed. The box 20 may have rigid side walls 28 and a rigid top 30 and rigid bottom 32. The top 30 may be provided with a retractable handle 46. Bolts 68 may project from the bottom 32 of the box 20 and may engage with the box 22 as shown in FIG. 7. A sliding door 34 with a magnetic latch 70 may be provided so that the bolts may be fastened with wing nuts 69 by a person who may set up the booth 10 at an event. The sliding doors 34 may also be useful for access to equipment and to allow access for making electrical interconnections between the boxes 20, 22 and 24. Equipment in the boxes may be electrically interconnected with wiring passing through wire management holes 40.

Figure 4:
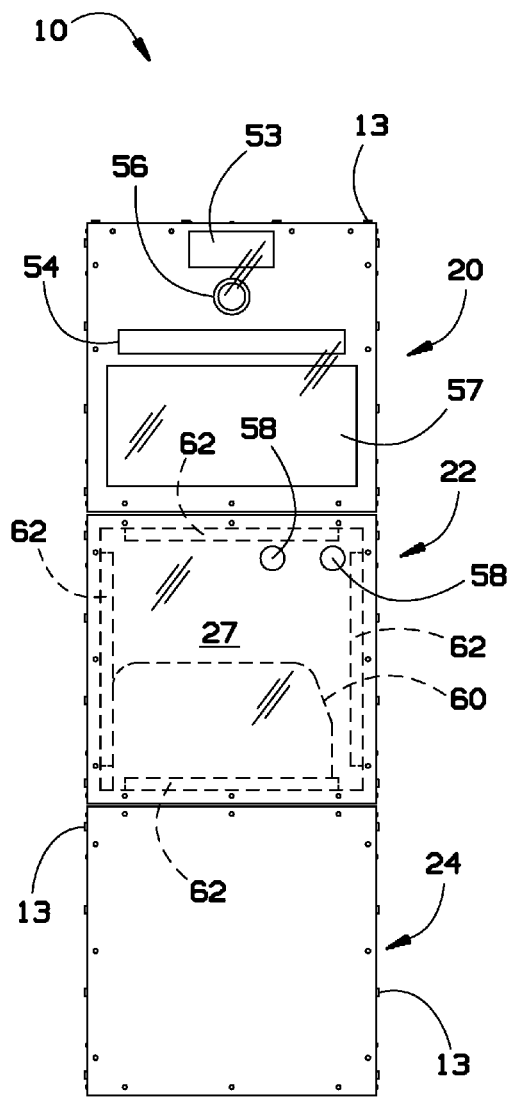
FIGS. 4 and 5 are elevation views of a camera box, a printer box and a storage/power box in accordance with an embodiment of the invention.
Figure 5:
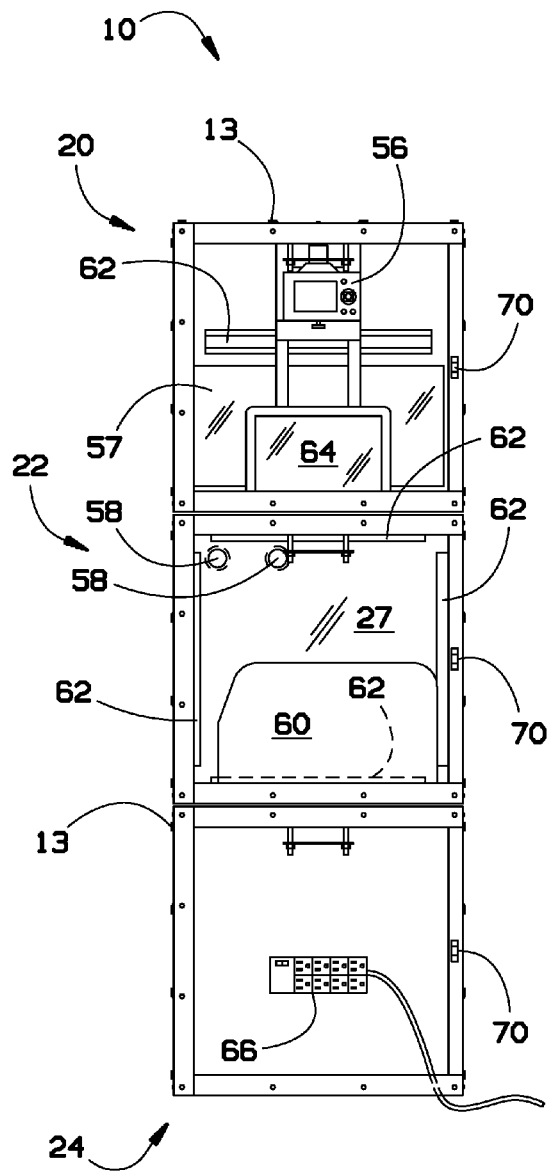
Figure 6:
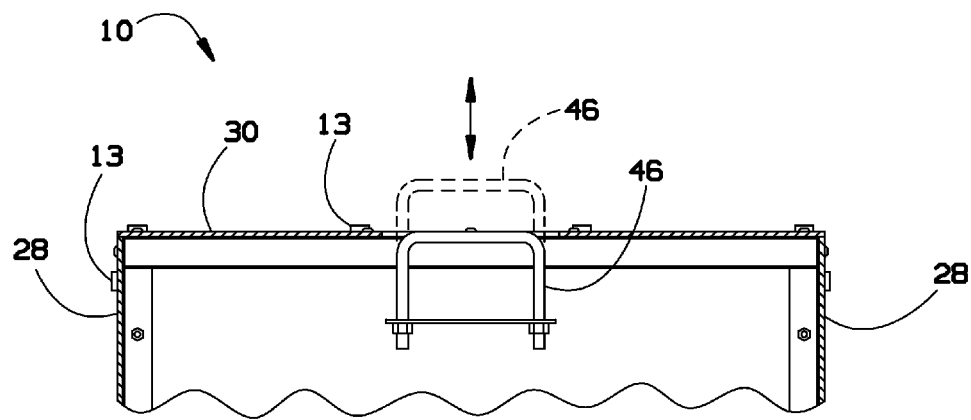
FIGS. 6 and 7 are partial sectional views of the equipment boxes of FIGS. 2 and 3 showing interconnection between the boxes in accordance with an embodiment of the invention.

Referring now to FIGS. 4 and 5, it may be seen that the camera box 20 may securely support a camera 56, a flash light source 53, a diffused light source 54, a monitor 57 (e.g., a flat-panel monitor), and a computer 64 (e.g., a laptop computer or a dedicated processing unit). The camera 56, the light sources 53 and 54, the monitor 57, and the computer 64 may be permanently positioned in the camera box 20 and the box 20 may be transported between sites without detaching the elements from one another.

Similarly, the printer box 22 may securely support a printer 60. After a photo is taken, the printer 60 may produce a print which may be collected by a user of the photo booth 10 at a printer chute 74 (See FIG. 1). In an exemplary embodiment of the invention, the printer box 22 may be provided with a translucent cover 27 and LED lighting 62 positioned behind the cover 27. The LED lighting 62 may provide general illumination in the enclosure 11.

Additionally, the storage/power box 24 may support electrical power supplies (e.g., a power cord and surge protectors 66) and may be used to store backup equipment and operating supplies.

In operation, the photo booth 10 may be used by one or more persons, who may enter the enclosure 11, operate the photo booth 10 and receive a print of an image taken by the camera at the photo chute 74. A user may press an arcade-style push button 58 to start a picture taking sequence, and then follow instructions on a "live-view" monitor 57. In an exemplary embodiment the monitor may be a flat screen LCD with a touch-screen interface. The user may enter demographic data. The computer 64 may store relevant data such as date of event when picture is taken and names of persons photographed. Such data may be useful to an owner of the photo booth 10, an owner of the venue, or an event host, for various purposes such as future marketing.

When a particular event is over, the photo booth 10 may be disassembled into readily transportable components. For example, the photo booth 10 may be disassembled into a collection of components which may include the boxes 20, 22 and 24; the frame 18 (in a collapsed form); the canopy top 12; and the side walls 14 (which may be folded for transport). In its disassembled state, the photo booth 10 may be carried, by one person, to a conventional vehicle for transport to another site. Upon arrival at a new site, the photo booth 10 may be reassembled and made ready for use.

Reassembly may be performed by erecting the frame 18; attaching the tent-like side wall 14 and canopy top; attaching the boxes 20, 22 and 24 to the enclosure; connecting the boxes 20, 22 and 24 together; interconnecting the equipment in the box 20 with equipment in the boxes 22 and 24; and applying electrical power to the storage/power box 24.

It should be understood, of course, that the foregoing relates to exemplary embodiments of the invention and that modifications may be made without departing from the spirit and scope of the invention as set forth in the following claims.

I claim:

1. An equipment box for a portable photo booth comprising:
   a top with a retractable handle;
   a bottom with attachment bolts; and
   a slidable access door.

2. The equipment box of claim 1 further comprising:
   a camera;
   a computer connected to the camera;
   a monitor connected to the computer; and
   a light source for illuminating users so that pictures may be properly exposed.

3. The equipment box of claim 1:
   wherein the box has a weight no greater than about 20 pounds; and
   wherein the box has a volume no greater than about four cubic feet.

4. A portable photo booth comprising:
   a tent-like enclosure;
   at least a first equipment box attached to the enclosure;
   a second equipment box attached to the enclosure; and
   a third equipment box, wherein the first, second and third equipment boxes are selectively attachable and detachable from one another, further wherein the first equipment box contains a camera, a computer, a monitor, and a light source; the second equipment box contains a printer, and a light source; and the third equipment box contains a surge protector and provides storage for backup equipment and operating supplies.

5. A method for providing a portable photo booth for an event comprising the steps of:
   erecting a frame;
   applying a tent-like enclosure to the frame; and
   attaching one or more equipment boxes to the enclosure, wherein each of the one or more equipment boxes include:
   a top with a retractable handle;
   a bottom with attachment bolts; and
   a slidable access door.

6. The method of claim 5 further comprising:
   attaching at least a first equipment box and a second equipment box to one another with mechanical fasteners; and
   electrically interconnecting equipment in the first equipment box to equipment in the second equipment box.

* * * * *